United States Patent
Nomoto et al.

(10) Patent No.: US 10,311,097 B2
(45) Date of Patent: Jun. 4, 2019

(54) IMAGE RETRIEVING APPARATUS AND METHOD

(71) Applicant: CANON KABUSHIKI KAISHA, Tokyo (JP)

(72) Inventors: Atsuo Nomoto, Tokyo (JP); Hiroshi Sato, Kawasaki (JP); Yuji Kaneda, Kawasaki (JP); Takashi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 727 days.

(21) Appl. No.: 14/947,080

(22) Filed: Nov. 20, 2015

(65) Prior Publication Data

US 2016/0147793 A1   May 26, 2016

(30) Foreign Application Priority Data

Nov. 25, 2014   (JP) .................................. 2014-238234

(51) Int. Cl.
   *G06F 16/58*     (2019.01)
   *G06F 16/583*    (2019.01)
   (Continued)

(52) U.S. Cl.
   CPC ........ *G06F 16/5838* (2019.01); *G06F 16/287* (2019.01); *G06F 16/5854* (2019.01); *G06K 9/00228* (2013.01)

(58) Field of Classification Search
   CPC .......... G06F 17/30244–17/3028; G06F 16/50; G06F 16/55; G06F 16/58; G06F 16/583; G06F 16/5854
   See application file for complete search history.

(56) References Cited

U.S. PATENT DOCUMENTS 6,463,426 B1 * 10/2002 Lipson .............. G06F 17/30247
7,023,446 B1 *  4/2006 Iwasaki ............. G06F 17/30247
                                                   345/581
(Continued)

FOREIGN PATENT DOCUMENTS

| JP | 2003296165 A | 10/2003 |
| JP | 2007025876 A |  2/2007 |
| JP | 2009087005 A |  4/2009 |

OTHER PUBLICATIONS

Viola et al., "Robust Real-Time Face Detection" International Journal of Computer Vision 57(2), pp. 137-154, 2004.
(Continued)

*Primary Examiner* — Robert W Beausoliel, Jr.
*Assistant Examiner* — Nirav K Khakhar
(74) *Attorney, Agent, or Firm* — Rossi, Kimms & McDowell LLP (57) ABSTRACT

An image retrieving apparatus is equipped with: an image obtaining unit for obtaining a plurality of images; a category obtaining unit for obtaining a category to which each of the obtained images belongs; a basic searching unit for searching a specific image including a specific object, from the obtained images; a counting unit for counting the number of the specific images for each category obtained; a determining unit for determining whether or not an additional search for the specific image is necessary for each category, based on the counted number of the specific images of each category; and an additional searching unit for searching the specific image from among the images which belong to the category for which it has been determined that the additional search is necessary and from which the searched specific image has been excluded.

12 Claims, 9 Drawing Sheets

(51) Int. Cl.
*G06F 16/28* (2019.01)
*G06K 9/00* (2006.01)

(56) References Cited

U.S. PATENT DOCUMENTS

| | | | | |
|---|---|---|---|---|
| 8,990,199 | B1 * | 3/2015 | Ramesh | G06F 17/30256 |
| | | | | 707/736 |
| 2004/0213553 | A1 * | 10/2004 | Nagahashi | G06F 17/30259 |
| | | | | 386/241 |
| 2006/0020597 | A1 * | 1/2006 | Keating | G06F 17/3025 |
| 2006/0153456 | A1 * | 7/2006 | Foote | G06F 17/30247 |
| | | | | 382/190 |
| 2008/0082426 | A1 * | 4/2008 | Gokturk | G06F 17/30256 |
| | | | | 705/26.62 |
| 2009/0132953 | A1 * | 5/2009 | Reed, Jr. | G06F 3/0481 |
| | | | | 715/781 |
| 2015/0286896 | A1 * | 10/2015 | Watanabe | G06F 17/30247 |
| | | | | 382/103 |

OTHER PUBLICATIONS

Yang et al., "Articulated Pose Estimation with Flexible Mixtures-of-Parts" CVPR (Conference on Computer Vision and Pattern Recognition) Dept. of Computer Science, University of California, Irvine, pp. 1385-1392, 2011.

* cited by examiner

IMAGE RETRIEVING APPARATUS AND METHOD

BACKGROUND OF THE INVENTION

Field of the Invention

The present invention relates to image retrieving apparatus and method which retrieve a desired image from among a large number of images.

Description of the Related Art

In recent years, since various digital cameras have been popularized and the capacity of the storage to be used for the digital camera has been enlarged, it has become possible to photograph and store a large number of images. On another front, since it is seriously troublesome for a user to retrieve and find a desired image from among the large number of stored images, it has been demanded to develop a retrieving technique which enables the user to easily find the desired image. For example, Japanese Patent Application Laid-Open No. 2003-296165 discloses the technique of classifying images for each photographing hour and showing the classified images to a user. Since the photographing hour is helpful for the user when he/she remembers how the photographing was performed, the user can find the desired image with comparative ease.

Besides, Japanese Patent Application Laid-Open No. 2007-25876 discloses the technique of calculating importance for each category set based on the photographing hours, the photographing locations and the like, and showing the image of the high-importance category. Namely, by using this technique in which the importance is set from the category in which not only the photographing hours but also the locations are considered, a user can find a desired image more easily.

Besides, Japanese Patent Application Laid-Open No. 2009-87005 discloses the technique of automatically showing an image including a specific object by using image recognition technique. When a user wishes to retrieve the image including the specific object, the user can drastically reduce the troublesomeness necessary to select the desired image by using this technique, thereby achieving high convenience.

However, in such a method as described above, when the user wishes to retrieve the image including the specific object for each category, there is a case where oversight occurs in the retrieval result due to image misrecognition, a kind of recognition setting, or the like. In particular, when the category of which the importance is high for the user is retrieved, if the number of images in the relevant category is zero or small due to such oversight in the retrieval, thereby deteriorating convenience. On another front, if the image recognition technique capable of reducing oversight is used or the image recognition setting (typically, a threshold of recognition) in the recognition technique is adjusted to reduce oversight, since the number of images shown in the retrieval result is too large, the troublesomeness necessary for the user to select the desired image increases, thereby deteriorating convenience.

SUMMARY OF THE INVENTION

According to one aspect of the present invention, an image retrieving apparatus is equipped with: an image obtaining unit configured to obtain a plurality of images; to which each of the images obtained by the image obtaining unit belongs; a basic searching unit configured to search a specific image including a specific object, from the images obtained by the image obtaining unit; a counting unit configured to count the number of the specific images for each category obtained by the category obtaining unit; a determining unit configured to determine whether or not an additional search for the specific image is necessary for each category based on the number of the specific images of each category counted by the counting unit; and an additional searching unit configured to search the specific image from among the images which belong to the category for which it has been determined by the determining unit that the additional search is necessary and from which the specific image searched by the basic searching unit has been excluded.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Hereinafter, the first embodiment of the present invention will be described in detail with reference to the attached drawings. In the present embodiment, an example in case of using an image retrieving apparatus for the purpose that a user of the image retrieving apparatus searches a photograph showing a specific person as a main subject will be described. That is, as an example of the image retrieval of retrieving an image showing a specific object, an image retrieving process in case of retrieving an image widely showing a face of the specific person near the center of the image will be described.

<Hardware Constitution>

Figure 1:
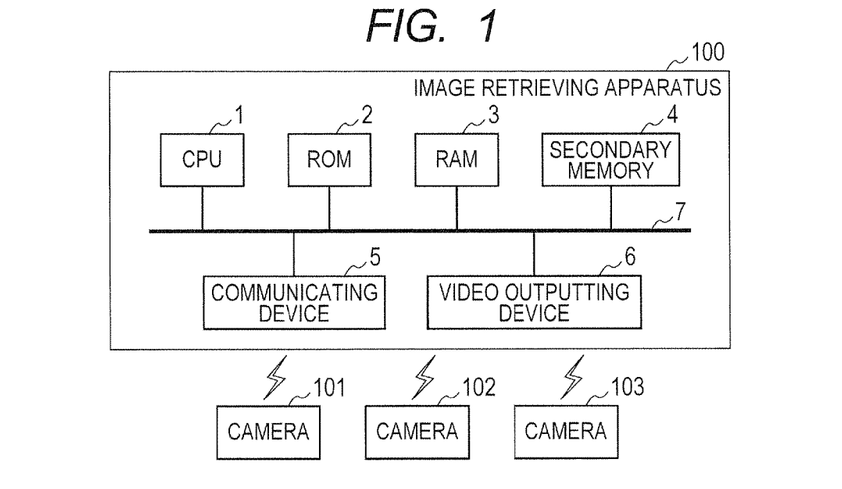
FIG. 1 is a block diagram illustrating an example of the hardware constitution of an image retrieving apparatus according to the first embodiment.

An example of the hardware constitution of the image retrieving apparatus in the present embodiment is illustrated in FIG. 1. As illustrated in FIG. 1, an image retrieving apparatus 100 in the present embodiment is composed of a CPU (central processing unit) 1, a ROM (read only memory) 2, a RAM (random access memory) 3, a secondary memory 4, a communicating device 5, a video outputting device 6 and a connecting bus 7. The CPU 1 controls the whole apparatus by executing controlling programs stored in the ROM 2 or the RAM 3.

The ROM 2, which is a nonvolatile memory, stores the controlling programs and various parameters. The controlling program, which is executed by the CPU 1, causes to work this apparatus as a means for executing each process to be described later. The RAM 3, which is a volatile memory, temporarily stores image data and the controlling programs and the execution result of the controlling programs.

The secondary memory 4, which is a rewritable secondary memory such as a hard disk, a flash memory or the like, stores images, controlling programs, various setting contents, a processed result for the retrieval and the like. The above information is output to the RAM 3 and utilized by the CPU 1 to execute the program. The communicating device 5, which is a wireless communicating unit, is used to communicate with other devices. The communicating device 5 may be a wired communicating unit. The video outputting device 6 is a monitor such as a CRT (cathode ray tube) or a TFT (thin film transistor) liquid crystal. This monitor displays image data, the execution result of the controlling program or the like obtained from the RAM 3 or the secondary memory 4. The connecting bus 7 connects the CPU 1, the ROM 2, the RAM 3, the secondary memory 4, the communicating device 5 and the video outputting device 6 with each other and inputs and outputs data mutually.

Cameras 101 to 103 are general cameras, and each of them is composed of an imaging devices, a storage unit for storing an image which was imaged and a communicating device which outputs the image to an external device. In the present embodiment, the three cameras 101 to 103 are connected to the image retrieving apparatus 100 through communicating devices (not illustrated) of the cameras and the communicating device 5 of the image retrieving apparatus 100 as illustrated in FIG. 1. The number of cameras to be connected is not limited to this case. The cameras 101 to 103 transmit the images stored in the own storage units to the image retrieving apparatus 100, which stores these images into the secondary memory 4.

Although a process to be described later is assumed to be realized by software by using the CPU 1 of the image retrieving apparatus 100, all or a part of the process may be realized by hardware. As the hardware, a dedicated circuit (ASIC (application specific integrated circuit)) or a processor (reconfigurable processor or DSP (digital signal processor)) or the like can be used. Software (program), in which the process to be described, later is described, is obtained through a network or various storage media, and the obtained software may be executed at a processing device (CPU or processor) of a personal computer or the like. In the present embodiment, although imaging data is obtained from the cameras 101 to 103 through the communicating device 5, the image retrieving apparatus 100 may have an imaging device and images may be obtained by performing a photographing operation by using that imaging device.

<Function Configuration>

Figure 2:
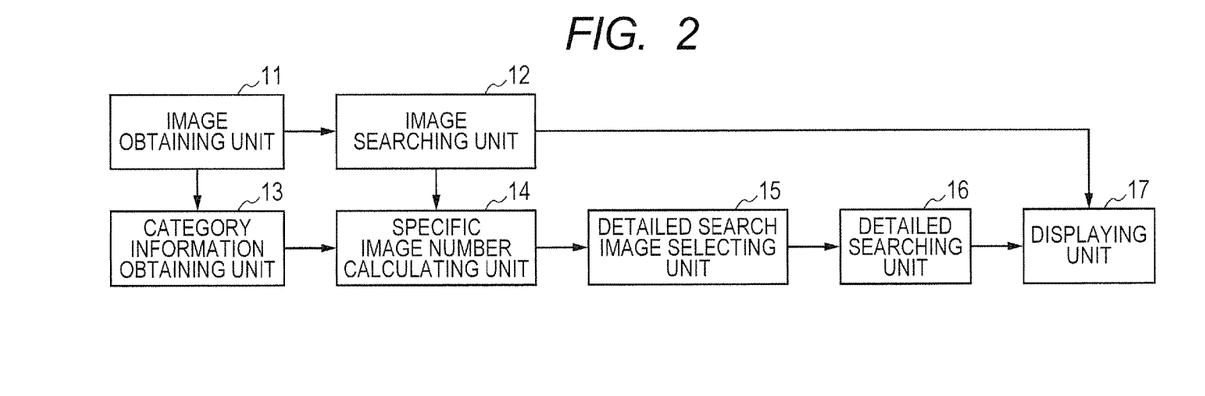
FIG. 2 is s block diagram illustrating the function configuration of a controlling program for the image retrieving apparatus according to the first embodiment.

FIG. 2 is a block diagram illustrating an example of a function configuration of a controlling program for the image retrieving apparatus in the present embodiment. As illustrated in FIG. 2, the function configuration of the controlling program of the present embodiment includes an image obtaining unit 11, an image searching unit 12, a category information obtaining unit 13, a specific image number calculating unit 14, a detailed search image selecting unit 15, a detailed searching unit 16 and a displaying unit 17. The function configuration indicated here can be realized by a combination of hardware and software, and one function block does not correspond to the one hardware.

The image obtaining unit 11 obtains images from the cameras 101, 102 and 103 through the communicating device 5, stores the images into the secondary memory 4 and outputs the images to the image searching unit 12 and the category information obtaining unit 13 in accordance with a request. The images to be obtained here include a face image showing a face of a person, a human body image showing the whole or a part of a person, an image not showing a person or another image.

The image searching unit 12 searches the image stored in the secondary memory 4 and discriminates whether or not the image is a specific image showing a specific person and then outputs a search result to the specific image number calculating unit 14 and the displaying unit 17. The search result is such information indicating whether or not each image is the specific image, that is, whether or not the specific person is shown in the image. The specific image means such an image showing a specific object (in this embodiment, a specific person). The category information obtaining unit 13 obtains category information from the image, which was obtained from the image obtaining unit 11, and outputs the obtained category information to the specific image number calculating unit 14. The category information is such information which indicates a group, to which the each image belongs, and typically, it is a photographing location, a photographing date and time or the like.

The specific image number calculating unit 14 calculates (counts) the number of specific images for each category from the category information, which was obtained, from the category information obtaining unit 13, and the search result, which was obtained from the image searching unit 12. The calculated number of specific images for each category and the search result are output to the detailed search image selecting unit 15. The detailed search image selecting unit 15 selects a category, which is to be searched in detail, from the search, result and the number of specific images for each category obtained from, the specific image number calculating unit 14 and obtains an image, which belongs to that category, from the secondary memory 4 and then outputs that image to the detailed searching unit 16.

The derailed searching unit 16 obtains a detailed search target image from the detailed search image selecting unit 15 and performs the detailed search (additional search). Thereafter, the detailed searching unit 16 outputs the detailed search result to the displaying unit 17. The detailed, search result is such information which indicates whether or not each image is the specific image, that is, whether or not the specific person is shown in the image. The displaying unit 17 functions as a showing unit for showing the search result to a user and outputs the detailed search result, which was obtained from the detailed searching unit 16, and the search result, which was obtained from the image searching unit 12, to the video outputting device 6 to display the result.

<Entire Process>

Figure 3:
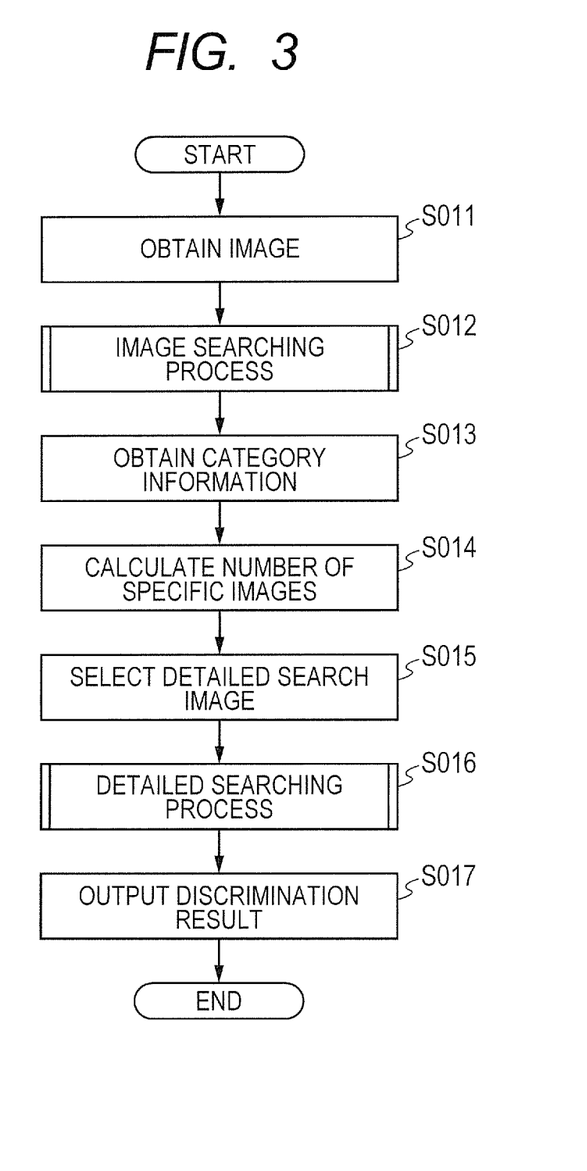
FIG. 3 is a flow chart indicating an image retrieving process according to the first embodiment.

FIG. 3 indicates an example of a flow chart related to processes of searching and displaying an image showing a specific person to be performed by the image retrieving apparatus 100 of the present embodiment. Actual processes will be described in detail with reference to FIG. 3. When this flow is started, the power of the image retrieving apparatus 100 and the cameras 101 to 103 is turned on and the preparation of transmitting images from the cameras 101 to 103 to the image retrieving apparatus is assumed to be in a completed state.

First, the image obtaining unit 11 receives images from the cameras 101 to 103 through the communicating device 5 (S011). It is assumed that metadata, in which information of the camera settings, a photographing location or the like at the time of photographing the image is described, is attached to the image to be received at this time. For example, an image of Exif (Exchangeable image file format) can be used.

Subsequently, the image searching unit 12 obtains the images from the image obtaining unit 11 and performs an image searching process (basic search) of the image showing a specific person (S012). In the present embodiment, the image is searched by performing a discriminating process which discriminates whether or not the specific person is shown in the image. At this time, a filtering process is performed with the position and size of a face of a person, and only a race of a person widely shown near the center of the image is treated as a search target. Accordingly, the search result more suitable with a purpose of a user of searching a photograph, in which a specific person is shown as a main subject, can be obtained. The details of the image searching process will be described later. Subsequently, the category information obtaining unit 13 obtains the images from the image obtaining unit 11 and obtains category information from the obtained images (S013). In the present embodiment, categories are automatically classified from a photographing hour and a photographing location (GPS (global positioning system) data). The photographing hour and the photographing location are read out from metadata of the image.

Figure 4:
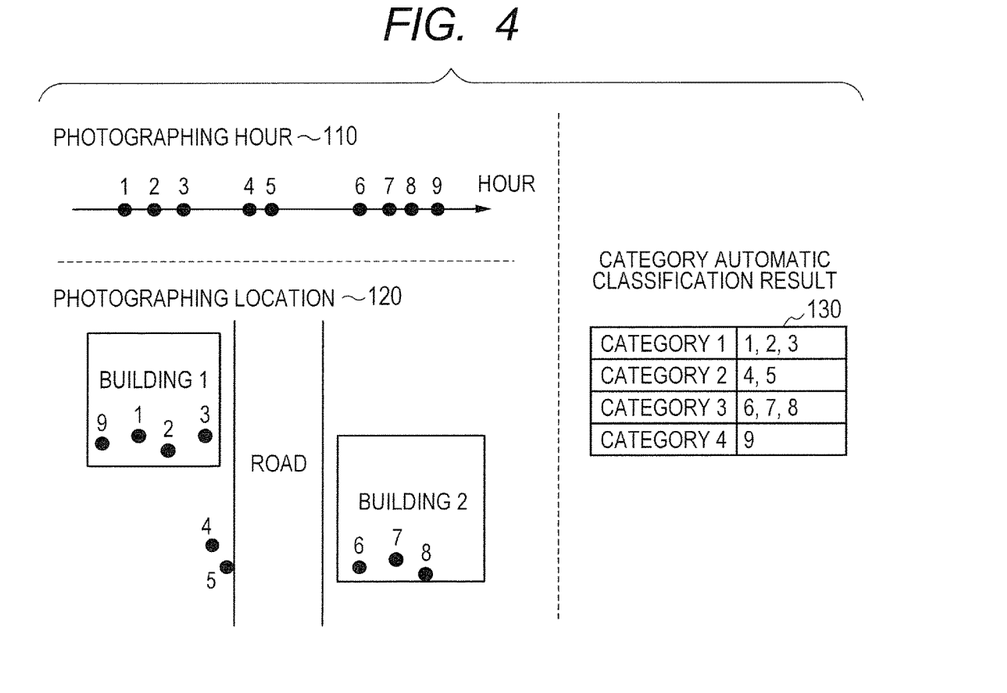
FIG. 4 is a schematic diagram for describing a category automatic classifying method.

FIG. 4 is a schematic diagram indicating the details of the automatic classifying of categories. In FIG. 4, a photographing hour 110, a photographing location 120 and a category automatic classification result 130 are indicated. The photographing hour 110 indicates that at what hour each of the images was photographed by the marks of black circles and the image number and means that total nine images, of which the image numbers are 1 to 9, were photographed with the advance of hour in this diagram.

The photographing location 120 indicates that at what positions the nine images indicated at the photographing hour 110 were respectively photographed. The black circle having the same number at the photographing hour 100 and the photographing location 120 means the same image. Incidentally, map data displayed in this diagram is previously stored into the secondary memory 4. A result obtained by automatically classifying the categories from the photographing hour 110 and the photographing location 120 is the category automatic classification result 130. Here, the category is automatically set on the basis or a range of the photographing hour and a range of the photographing location which were previously set.

As indicated, in FIG. 4, since the images, of which the image numbers are 1 to 3, are within closed ranges for both the photographing hour and the photographing location, these images are set in the same category 1. Since the image of the image number 9 is close to the images, of which the image numbers are 1 to 3, as to the photographing location bur apart from the images, of which the image numbers are 1 to 3, as to the photographing hour, the image of the image number 9 is set as a category 4 different from the category 1 of the images, of which the image numbers are 1 to 3. Also as to the remaining images, the categories are similarly automatically classified. As for a rule of automatically classifying the categories, it may be set based on only the photographing hour or may be set based on only the photographing location. In addition, it may be set based on a unit of another metadata or a combination of plural other metadata.

In the present embodiment, although a case of automatically classifying the categories in accordance with a previously set rule and metadata of the image has been described, as to an obtaining method of category information, a method other than the above-described case may be used. For example, the category may be set on the basis of a recognition result by recognizing the image. Or, the category may be set by the same age by estimating age of a person shown in the image. Consequently, for example, a category for each age can be set for an image group relevant to a period from childhood to an adult of a certain person, and an image retrieving apparatus having high convenience can be realized. In addition to the above case, the category may be set based on the size of an image, a kind of camera which took a photograph, the settings of the camera or the like.

Subsequently, the specific image number calculating unit 14 calculates (counts) the number of images showing a specific person for each category (specific person image number for each category) from the category information and the image search result (S014).

Subsequently, the detailed search image selecting unit 15 selects an image, to which a detailed search (additional search) is performed, from the specific person image number for each category (S015).

Figure 5:
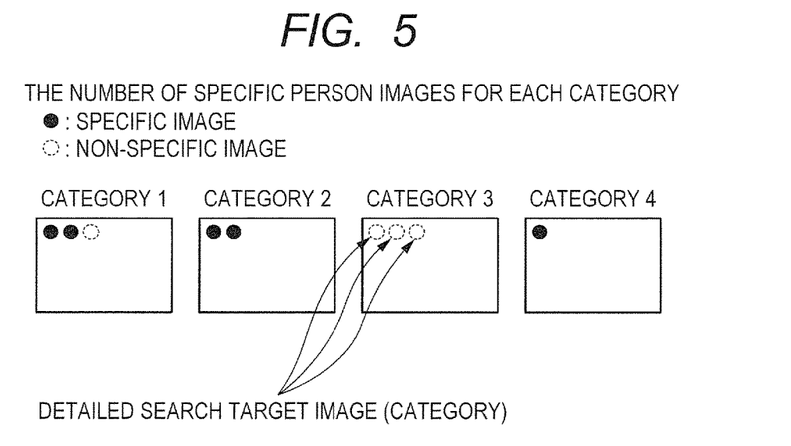
FIG. 5 is a schematic diagram for describing a selecting process of a detailed search target image.

FIG. 5 is a schematic diagram illustrating a process when deciding the image to which the detailed search is performed. As illustrated in FIG. 5, a specific person image for each category is indicated by the mark of black circle and a non-specific image, which was determined, by the image searching unit 12 that a specific person is not shown, is indicated by the mark of white circle of broken line. In a case of this example, it means that two images are decided as specific images among three images which belong to the category 1. When looking at a category 3, a result that there is no image decided as the specific image among three images is obtained. Here, since the number of the specific images which belong to this category 3 is less than a predetermined number (in the present embodiment, one image), the images of the category 3 are selected as the detailed search target images.

Thereafter, a list of the selected detailed search target images for each category is stored into the secondary memory 4, and the list is used in a process to be performed later in the detailed searching unit 16. In the present embodiment, although the detailed search target image was selected by comparing the number of specific images with a predetermined number, a method other than the above case may be used. For example, when the number of specific images exceeds a predetermined percentage in each of the categories, the images may be selected as the detailed search target images. In addition, although the detailed search target images are listed to be used in the detailed searching unit 16, a method of transmitting the detailed search target images to the detailed searching unit 16 is not limited to this case. The detailed search target images themselves may be output, to the detailed searching unit 16.

In the present embodiment, the category is set based on information meaningful for a user such as the photographing hour or the photographing location. In this case, in the category meaningful for the user (in this example, the category 3), there sometimes occurs a state that there is no image in the search result because of an oversight. There is possibility that the oversight occurs due to a fact of performing a filtering process with the position and size of a face when the image searching unit 12 performs a searching process. It can be said that this filtering process is an effective method in a purpose of searching an image widely showing a face for the image near the center thereof.

However, in case of occurring a state that there is no image in the search result of a certain category, it is considered that high convenience is obtained for a user in such a state that even one image is shown in the search result rather than such a state that the image is not shown in the search result, even if the size of a face is smaller in some degree or even if a positron of a face is slightly shifted to an edge of the image. Therefore, in the present embodiment, this category 3 is selected as the category having the detailed search target images, and the reduction of oversight is attained by a detailed searching process to be described later.

Subsequently, the detailed searching unit 16 performs the detailed searching process to the detailed search target image selected by the detailed search image selecting unit 15 (S016). Since the detailed search target images are stored in the secondary memory 4 as a list format, the list is read, and these target images stored in the secondary memory 4 are obtained. According to this detailed searching process, there is possibility that the specific image which was overlooked in the image searching process in S012 can be added to the search result. The details of the detailed searching process will be described later.

Subsequently, the displaying unit 17 obtains the detailed search result of the detailed searching unit 16 and the search result of the image searching unit 12 and displays the final search result. When, displaying the final search result, it is displayed by merging the detailed search result and the search result. The detailed search result may be additionally displayed in accordance with a request from the user by initially displaying the search result. By performing this method, the image retrieving apparatus having higher convenience can be provided for the user satisfied with the search result according to only the search result of the image searching unit 12. The above description indicates an entire process flow in the present embodiment.

<Image Searching Process>

Figure 6:
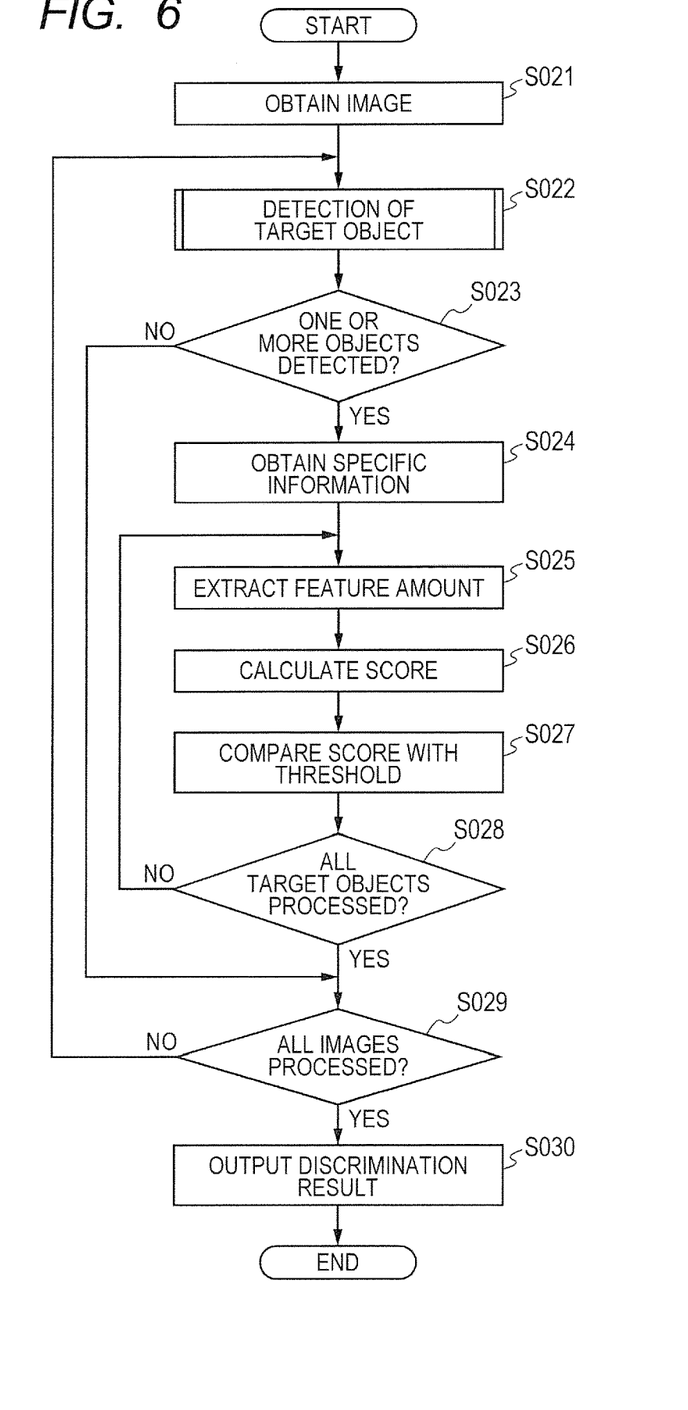
FIG. 6 is a flow chart indicating the image retrieving process according to the first embodiment.

FIG. 6 is a process flow chart indicating the details of the image searching process (S012 in FIG. 3) in the present embodiment. The details of a specific process will be described with reference to this drawing. The whole process of this image searching process is performed in the image searching unit 12.

First, the image searching unit 12 obtains an image from the image obtaining unit 11 (S021). Subsequently, a face of a person, which is a target object, is detected from the obtained image (S022). As for the method of detecting the face of the person, a conventional method may be used. For example, a method described in "Robustreal-time face detection" by P. Viola and M. Jones described in page 11:747 in 2001 can be used. After performing the detection of the face, a filtering process is performed with the position and size of the face. That is, it is determined that a face of which the size is less than a predetermined percentage for the image or a face which does not exist in a predetermined range near the center of the image is not a face.

Figure 7:
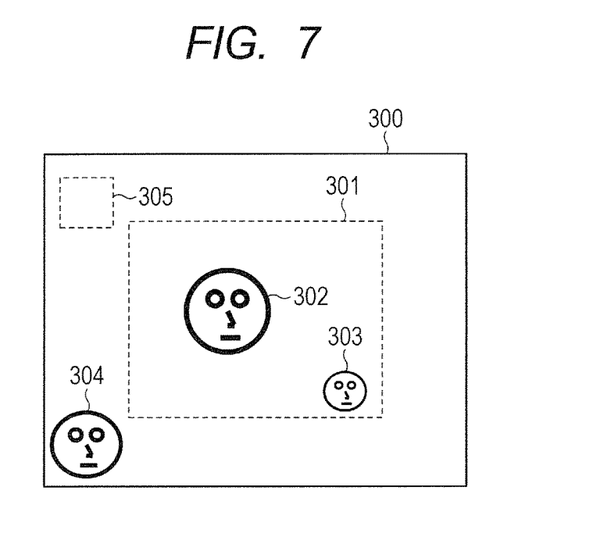
FIG. 7 is a schematic diagram illustrating the positions and the sizes of faces to be detected in the first embodiment.

FIG. 7 is a schematic diagram for describing an example of a filtering process. This schematic diagram illustrates an image 300 showing faces 302 to 304 of persons, and a face coordinate range 301 and a standard circumscribed rectangle 305 are not shown originally but illustrated for the purpose of the description. In the case of this drawing, in the image 300, a face which does not exist within the face coordinate range 301 is eliminated or excluded. Accordingly, the face 304 is eliminated because it exists outside the range.

The standard circumscribed rectangle 305 indicates a standard size of a circumscribed rectangle which surrounds an outline of the detected face, and a face which can enter within this rectangle is regarded as a small face, and this face is eliminated. Accordingly, the face 303 is eliminated. A face which finally remains as a face of the search result according to the above-described filtering process is only the face 302. Accordingly, only a face which is large for the image and shown near the center of the image can be treated as a target object to be discriminated when it is discriminated whether or not a specific person is shown in the image in the process to be continued hereinafter. By performing this way, an image showing the specific person as a main subject can be searched in this image searching process.

Subsequently, when the face of the person does not exist in the image (NO in S023), the flow advances to a process of determining whether or not the all images were processed (S029). When one or more faces of persons exist in the image (YES in S023), specific information previously loaded into the RAM 3 is obtained (S024). The specific information is, for example, a face image (of a specific person), which a user designates as a search query, and it is determined whether or not the specific person is shown in the image by comparing this face image with the face image which was detected in S022. The feature amount obtained from the face image may be registered instead of the face image itself as the specific information. The specific information may be previously stored into the secondary memory 4. When plural persons are included in the specific information, the selection may be given to the user about the matter what person is to be searched. In that case, a selection input of the user through another device may be received by using the communicating device 5.

Subsequently, one of the detected faces is selected and the feature amount thereof is extracted (S025). As for an algorithm of extracting the feature amount, a conventional method may be used. For example, an LBP (local binary pattern) feature amount, an HOG (histogram of oriented gradient) feature amount, an SIFT (scale-invariant feature transform) feature amount or the like can be used. The feature amount is similarly extracted also from the specific information. When the specific information includes plural face images, the feature amounts are extracted from the all face images. However, when the specific information is stored as the feature amount instead of the image, it is not required to perform, the extraction here.

Subsequently, the feature amount extracted from the detected face is compared with the feature amount extracted from the specific information and a score is calculated (S026). The score is a numerical value indicating how far the detected face is similar to the face of the specific information, and the higher score indicates the more similarity between them. As for the method of calculating the score, the conventional method may be used. For example, the cosine similarity or the like can be used. When the specific information includes plural face images, the score is calculated for all the combinations of the respective face images included in the specific information and the detected faces, and the maximum score is adopted as a representative score.

Subsequently, the calculated score is compared with a previously fixed threshold, and it is determined whether or not a person of the detected face is identical with a person of the specific information (S027). The threshold may be dynamically fixed. Subsequently, if the faces, to which a score calculating process is not yet performed, exist among the detected faces (NO in S028), the flow returns to S025 and the process is performed to the remaining faces. If the score calculating process is completed for all of the detected faces (YES in S028), it is determines whether or not the process is completed for all of the obtained images (S029). When the all images are not processed (NO in S029), the flow returns to S022, and the similar process is repeated. When the all images are processed (YES in S029), the search result is output to the specific image number calculating unit 14 (S030).

The above description indicates an image searching process flow in the present embodiment. As for the image searching process, another method other than the method enumerated here may be used. In the present embodiment, although the discrimination depending on a face image has been performed, the discrimination may be performed by using an image of the whole body or a part of a person.

<Detailed Searching Process>

Figure 8:
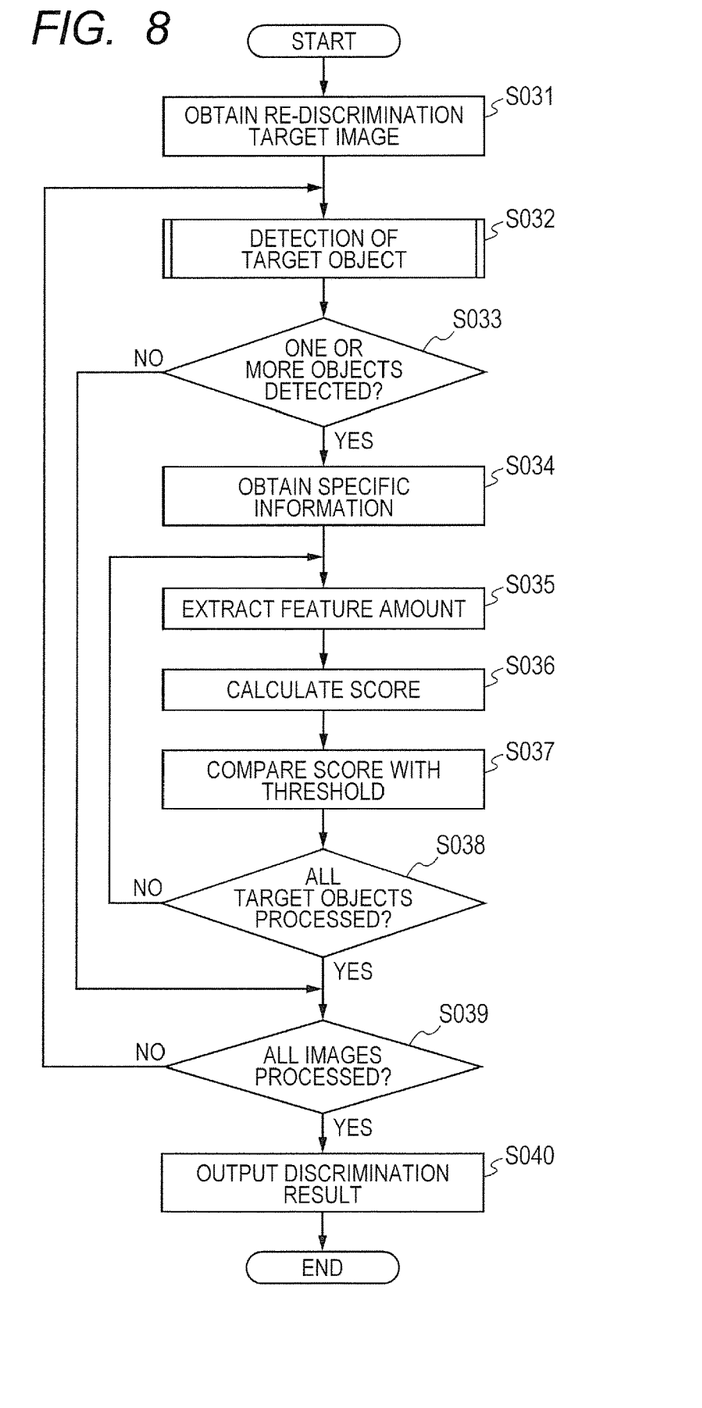
FIG. 8 is a flow chart indicating a detailed searching process according to the first embodiment.

FIG. 8 is a process flow chart indicating the details of the detailed searching process (S016 in FIG. 3) in the present embodiment. The details of a specific process will be described with reference to this drawing. Note that the whole of this detailed searching process is performed in the detailed searching unit 16.

Since the specific process flow has a lot of the same portions as those of the image searching process flow in FIG. 6, only a different part will be described, and the description of the same part will be omitted. First, the detailed searching unit 16 obtains the detailed search target image from the secondary memory 4 (S031) on the basis of an output of the detailed search image selecting unit 15.

Subsequently, a target object is detected from the obtained detailed search target image (S032). The filtering process described in FIG. 7 is not performed to a face detected this time, and faces of all sizes in the whole image area are to be detected. Accordingly, the oversight caused by the filtering according to the position and size of a face in the image searching process can be reduced. A face of the specific person to be searched in detail in this detailed searching process is in an either case or both cases that the face is a small sized face or arranged at the corner of the image.

When a user searches an image showing a specific person, there is possibility of not desiring an image having a small face or an image showing a face at the corner of the image. However, in a case that even one image is not included in the search result of a certain category, the user has the high convenience in a case that the face is displayed in the search result rather than a case that the face is not displayed in the search result even if the size of the face is less than a previously fixed threshold and a position of the face is arranged at the corner apart from the center of the image as compared with a previously fixed threshold in that category.

Although the detection of the face is performed again in the present embodiment, a detection result of the face when detecting the target object (S022 in FIG. 6) in the image searching process flow is stored in the RAM 3 or the secondary memory 4 and the detection result may be reutilized.

Since subsequent processes in S033 to S040 are the same as those in S023 to S030 of FIG. 6, the description thereof will be omitted. The above content is the description of the first embodiment. In the present embodiment, a method of retrieving an image showing a specific person from images, which were obtained from the camera, by the image retrieving apparatus has been described. First, the specific person is shown as a main subject by the image searching process, that is, an image of the specific person whose face is widely shown near the center of the image has been retrieved. After that, when even one image of the search result does not exist in a specific category, the detailed search of releasing the filtering according to the position and size of a face has been performed. Accordingly, a phenomenon of reducing the number of images of the search result in the specific category because of the oversight of an image by the image searching process can be suppressed.

In the detailed searching process (S016 in FIG. 3) of the present embodiment, although the re-retrieval different from the image searching process (S012 in FIG. 3) has been performed by releasing the filtering according to the position and size of a face, another searching method may be used. For example, the re-retrieval may be performed by more reducing a threshold to be compared with the score in the detailed searching process (S037 in FIG. 8) than a threshold to be compared with the score in the image searching process (S027 in FIG. 6). In addition, another feature amount different from the feature amount to be used in the image searching process (S025 in FIG. 6) may be used as the feature amount to be used in the detailed searching process (S035 in FIG. 8).

In the present embodiment, although the image retrieving process in case of retrieving an image showing a specific person has been described, another object other than a person may be retrieved. For example, a specific car or a specific animal may be retrieved. The scenery such as blue sky, a mountain or the like is discriminated as an object, and this object may be retrieved. Also in case of these objects, the present embodiment can be applied by measuring the size for an image or the position in the image.

Second Embodiment

In the first embodiment, a case that the image retrieving apparatus obtains images from the plural cameras and performs the image retrieval has been described. However, in the present embodiment, a case that the image retrieving apparatus itself has an imaging device will be described. Further, in the first embodiment, the detailed search has been performed by releasing the filtering according to the position and size of the detected face. However, in the present embodiment, an example of performing the detailed search by using attribute information other than a face from the image search result will be described. Incidentally, when performing a process which is the same as that of the first embodiment, the description thereof will be omitted, and only a part of a different process will be described.

<Hardware Constitution>

Figure 9:
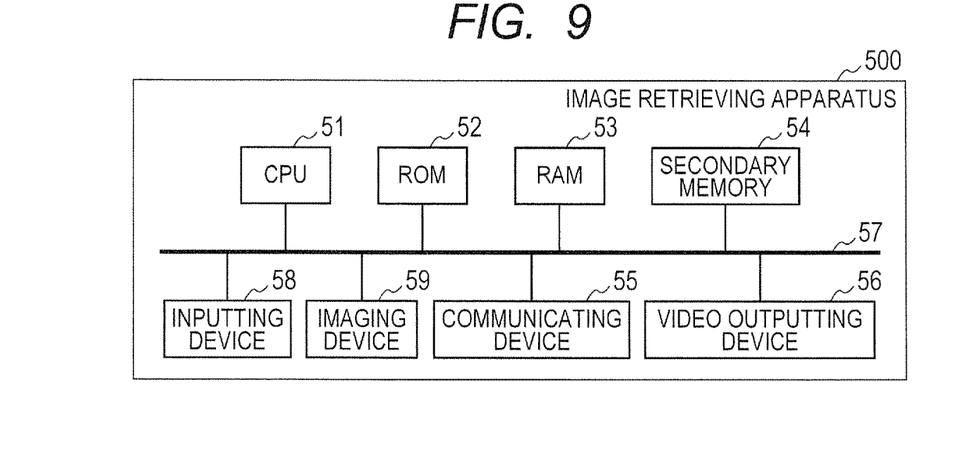
FIG. 9 is a block diagram illustrating an example of the hardware constitution of an image retrieving apparatus according to the second embodiment.

An example of the hardware constitution of an image retrieving apparatus in the present embodiment is indicated in FIG. 9. As illustrated in FIG. 9, an image retrieving apparatus 500 in the present embodiment is composed of a CPU 51, a ROM 52, a RAM 53, a secondary memory 54, a communicating device 55, a video outputting device 56, a connecting bus 57, an inputting device 58 and an imaging device 59.

The inputting device 50, which is an interface (I/F) composed of hardware buttons, accepts an operation of a user and outputs the operation contents to the respective units through the connecting bus 57. The imaging device 59, which is composed of a lens, imaging devices and the like of a general camera, stores a photographed image into the RAM 53 or the secondary memory 54. As for other hardware units, since these units are the same as those of the first embodiment, description thereof will be omitted. Similar to a case of the first embodiment, although a process to be described later is assumed to be realized by the software to be executed by the CPU 51, a part of or all of the process may be realized by the hardware.

<Function Configuration>

Figure 10:
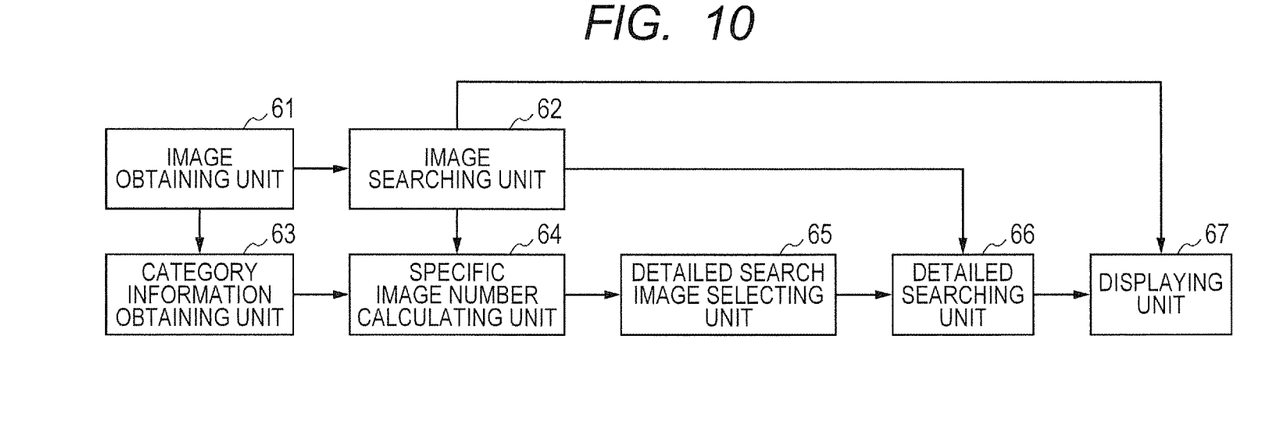
FIG. 10 is a block diagram illustrating the function configuration of a controlling program for the image retrieving apparatus according to the second embodiment.

FIG. 10 is a block diagram indicating an example of the function configuration of a controlling program of the image retrieving apparatus in the present embodiment. As indicated in this diagram, the controlling program of the present embodiment includes an image obtaining unit 61, an image searching unit 62, a category information obtaining unit 63, a specific image number calculating unit 64, a detailed, search image selecting unit 65, a detailed searching unit 66 and a displaying unit 67. Hereinafter, a part of which the function configuration is different from the function configuration (FIG. 2) of the first embodiment will be described. The function configuration indicated here can be also realized by a combination of the hardware and the software, and one function block does not correspond to the one hardware.

The image searching unit 62 searches a specific person from among images stored in the secondary memory 4 and outputs the search result to the specific image number calculating unit 64, the detailed searching unit 66 and the displaying unit 67. In addition, the image searching unit 62 extracts a feature amount which is used to determine attribute information from an image area of a person who was decided as a specific person and outputs the feature amount to the detailed searching unit 66. Specifically, the attribute information is such information of age, sex, height, color of clothing or the like of that person.

<Entire Process>

In the present embodiment, a process where a user retrieves a photograph showing a specific person and then an image is displayed after that the image retrieving apparatus 500 stored images photographed by the imaging device 59 into the secondary memory will be described. Since the entire process flow is similar to that of the first embodiment, an actual process will be described in detail with reference to FIG. 3. As for a process which is the same as that of the first embodiment, the description thereof will be omitted.

First, the image obtaining unit 61 obtains an image from the secondary memory 54 (S011). Here, the image stored in the secondary memory 54 was photographed by the imaging device 59.

Subsequently, the image searching unit 62 obtains the images from the image obtaining unit 61 and then performs an image searching process (S012). At this time, the detection and discrimination are performed for all the face sizes of a whole image area without filtering the face detected result with the position and size of the face.

A face image of a specific person to be retrieved may be photographed by the user by using the imaging device 59 or may be selected by the user from among previously registered candidates by using an inputting device. At this time, a feature amount to be used for discriminating attribute information other than face information has to be obtained for the person, who was decided as the specific person, as a result of the image search. In the present embodiment, a color histogram feature amount is extracted in order to discriminate color of clothing of the person.

A feature amount suitable for the attribute information also may be extracted in order to discriminate other attribute information. A conventional method of using the feature amount such as the LBP (local binary pattern) feature amount, the HOG (histogram of oriented gradient) feature amount, the SIFT (scale-invariant feature transform) feature amount or the like can be used. As other attribute information, the presence or absence of glasses, the presence or absence of clothing (fashion articles) such as a hat, gloves and the like can be considered.

Since subsequent processes S013 to S015 are the same as those of the first embodiment, the description thereof will be omitted. Subsequently, the detailed searching unit 66 performs a detailed searching process to the detailed search target image selected by the detailed search image selecting unit 65 (S016). In the present embodiment, the detailed search is performed by obtaining the attribute information other than a face from a result of the image searching process in S012. The details of the detailed searching process will be described later. Since a subsequent process in S017 is the same as that of the first embodiment, the description thereof will be omitted. The above description indicates an entire process flow in the present embodiment.

<Detailed Searching Process>

Figure 11:
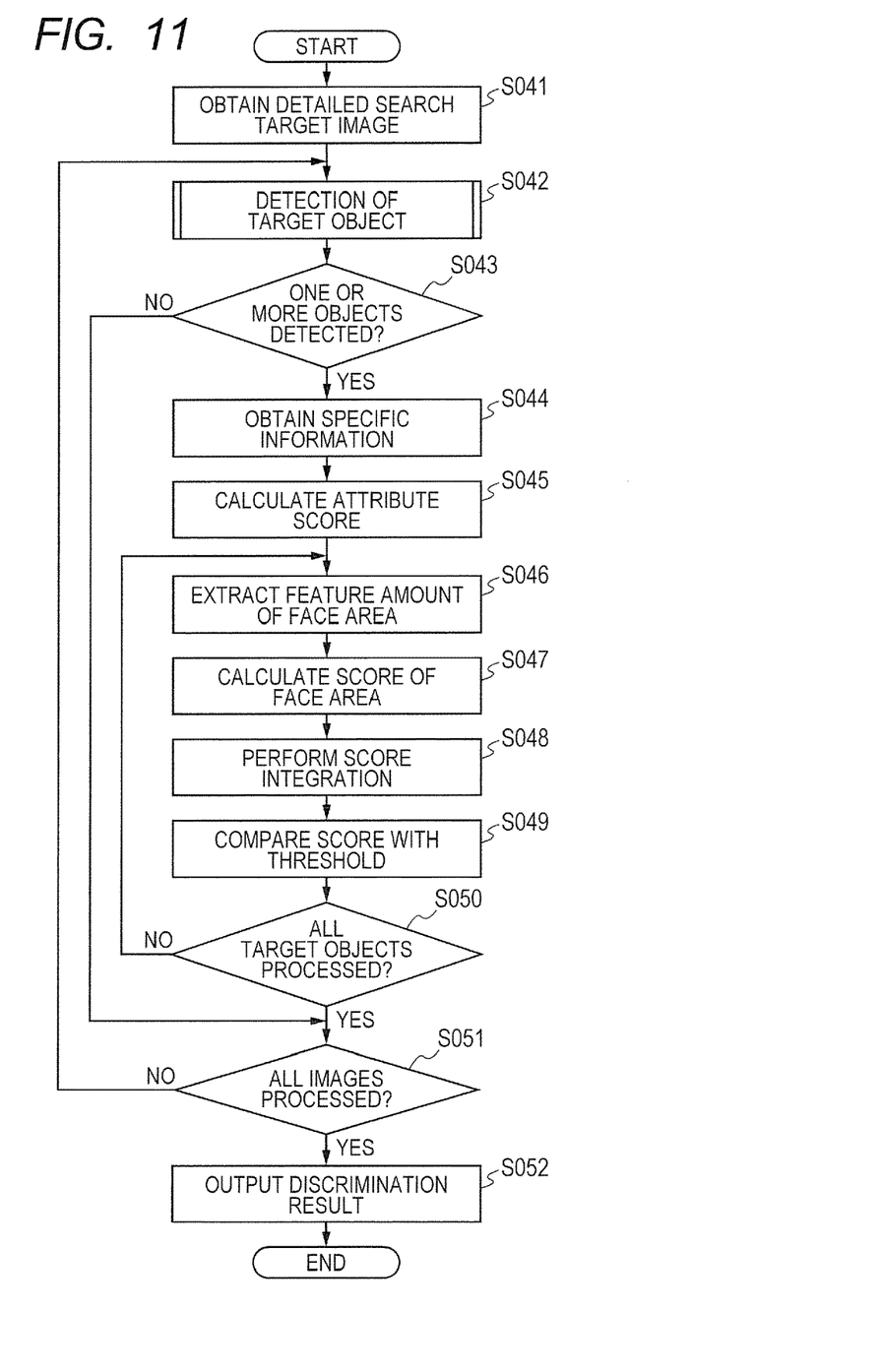
FIG. 11 is a flow chart indicating a detailed searching process according to the second embodiment.

FIG. 11 is a process flow chart indicating the details of the detailed searching process (S016 in FIG. 3) in the present embodiment. The details of a specific process will be described with reference to this drawing. All of this detailed searching process is performed in the detailed searching unit 66. Since processes from S041 to S044 are the same as those from S031 to S034 of the first embodiment, the description thereof will be omitted.

Subsequently, the detailed searching unit 66 obtains a feature amount, which is used in order to discriminate the attribute information, from the image searching unit 62 and then calculates an attribute score (S045). In the present embodiment, a color histogram feature amount, which is used in order to discriminate color of clothing, is extracted at the image searching unit 62 as the attribute information, and that extracted feature amount is used in this process.

Figure 12A:
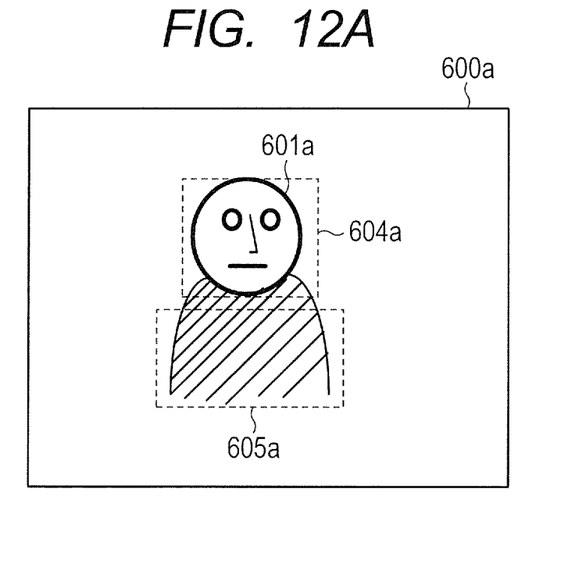
FIGS. 12A and 12B are schematic diagrams for describing the detailed searching process according to the second embodiment.
Figure 12B:
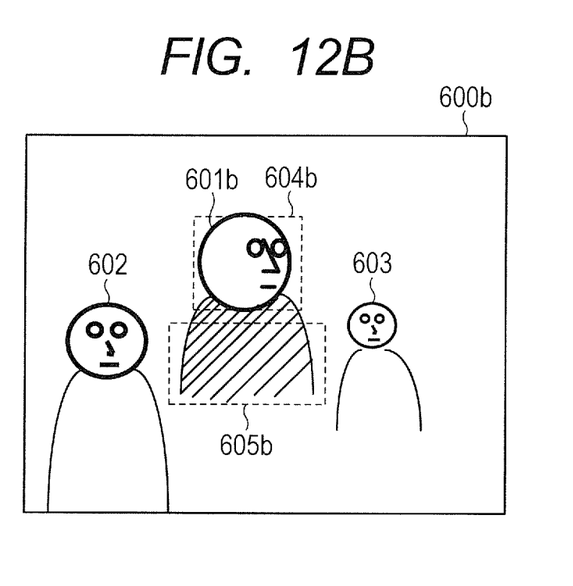

FIGS. 12A and 12B are schematic diagrams indicating an example of the detailed searching process to be performed here. FIG. 12A indicates an image 600a which was decided as a specific image and indicates a state that both of a face and a body part of a person 601a are included in that image 600a. FIG. 12B indicates a detailed search target image 600b obtained in S041 and indicates a state that both of faces and bodies of persons 601b, 602 and 603 are included in that image 600b. Here, it is assumed that a person desired to be searched by the user is the person 601b. In this example, since the person 601b turns aside, it is assumed that the score does not exceed a threshold and that person is overlooked (the image was not decided as a specific image) in the image searching process (an image searching process only using a face area 604b of the person 601b in FIG. 12B) of the image searching unit 62.

First, a color histogram is extracted from a clothing area 605b which exists under the face area 604b. Then, (1) the color histogram extracted from the clothing area 605b is compared with (2) a color histogram of a clothing area 605a of the person 601a decided as the specific person who was extracted, from the image 600a, which the image searching unit 62 decided as the specific image and then a score is calculated. That is, in the present embodiment, the detailed searching unit 66 searches the specific image by comparing information obtained from a part (clothing area 605a) of the specific object 601a shown in the specific image 600a searched by the image searching unit 62 with information obtained from a part (clothing area 605b), which is a part of the object 601b shown in the image 600b decided not as the specific image by the image searching unit 62, corresponding to a part (clothing area 605a) of the specific object shown in the image 600a decided as the specific image by the image searching unit 62.

As for the method of calculating the score, the conventional method may be used. The histogram intersection or the like between two color histograms can be used. In the present embodiment, although it is assumed that the clothing area exists under the face area by a predetermined distance, another method may be set. For example, the clothing area may be set by using a result of the parts detection of a human body. As the parts detection of a human body, a method described in "Articulated pose estimation using Flexible mixtures of parts" by Yang and D. Romanan in CVPR (Conference on Computer Vision and Pattern Recognition) 2011, 2011.

Subsequently, feature amounts are extracted from the face areas (face areas 604a and 604b respectively illustrated in FIGS. 12A and 12B) similar to the process of the image searching unit 62 (S046), and a score of the face area is calculated (S047). In the present embodiment, the score calculated in the image searching unit 62 has been held, and it may be reutilized.

Subsequently, the score calculated for the face area is integrated with an attribute score (discrimination score of clothing color) (S048). Here, these are integrated by the weighted sum indicated in the following.

$$S = \alpha \cdot F_{score} + (1-\alpha) \cdot C_{score}$$

Here, S is an integrated score, $F_{score}$ is a score calculated for the face area, $C_{score}$ is a discrimination score of clothing color and $\alpha$ is a constant of satisfying the condition $0<\alpha<1$. An integrating method is not limited to a method indicated here. Another conventional method may be used. Since processes from S049 to S052 are the same as the processes from S037 to S040 of the first embodiment, the description thereof will be omitted.

As described above, in the present embodiment, the score is calculated for only the face area in the image searching process, and the score is calculated also for the clothing area in the detailed searching process, and this score is integrated with the score calculated for the face area. Accordingly, the oversight of a person (person 601b in FIG. 12B), whose face turns aside, likely to be overlooked by only depending on the face area can be reduced. When a user searches an image showing a specific person, there is possibility of not desiring a face which turns aside. However, in a case that even one image is not included in the search result of a certain category, the user has the high convenience in a case that the face is displayed in the search result rather than a case that the face is not displayed in the search result even if the face does not turn to front, that is, the face turns aside in that category.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass ail such modifications and equivalent structures and functions.

This application claims the benefit of Japanese Patent Application No. 2014-238234, filed Nov. 25, 2014, which is hereby incorporated by reference herein in its entirety.

What is claimed is:

1. An image retrieving apparatus comprising:
   an image obtaining unit configured to obtain a plurality of images and store the obtained plurality of images in a storage device;
   a category obtaining unit configured to obtain respective categories to which the plurality of images obtained by the image obtaining unit belongs;
   a basic searching unit configured to search for a specific image, which is an image that includes a specific object, from among the images stored in the storage device;
   a counting unit configured to count a number of the specific images that include the specific object for each category obtained by the category obtaining unit;
   a determining unit configured to determine whether or not an additional search for the specific image that includes the specific object is to be performed for a category among the categories obtained by the category obtaining unit, based on the number of the specific images that include the specific object of each category counted by the counting unit; and
   an additional searching unit configured to search for the specific image that includes the specific object from among the images, stored in the storage device, which belong to the category for which it has been determined by the determining unit that the additional search is to be performed, the category for which it has been determined by the determining unit that the additional search is to be performed including no specific images including the specific object based on a result of the search performed by the basic searching unit.

2. The image retrieving apparatus according to claim 1, wherein the determining unit determines that the additional search is to be performed for a certain category, in a case where the number of the specific images counted by the counting unit for the certain category is smaller than a predetermined number of images or a percentage of the images decided as the specific images by the basic searching unit in the images belonging to the certain category is lower than a predetermined percentage.

3. The image retrieving apparatus according to claim 1, wherein the additional searching unit searches for the specific image by comparing information obtained from a part of the specific object shown in the specific image found by the basic searching unit with information obtained from a portion being a part of an object shown in an image decided as not the specific image by the basic searching unit and corresponding to the part of the specific object shown in the specific image found by the basic searching unit.

4. The image retrieving apparatus according to claim 1, wherein the basic searching unit calculates a score indicating how much an object shown in the image obtained by the image obtaining unit is similar to the specific object, and decides whether or not the image is the specific image by comparing a predetermined threshold with the score.

5. The image retrieving apparatus according to claim 4, wherein the additional searching unit calculates a score which indicates how much the object shown in the image obtained by the image obtaining unit is similar to the specific object and of which a kind is the same as that of the score calculated by the basic searching unit, and decides whether or not the image is the specific image by comparing a threshold different from the predetermined threshold used in the comparison by the basic searching unit with the score calculated by the additional searching unit.

6. The image retrieving apparatus according to claim 4, wherein the additional searching unit calculates a score which indicates how much the object shown in the image obtained by the image obtaining unit is similar to the specific object and of which a kind is different from that of the score calculated by the basic searching unit, and decides whether or not the image is the specific image by comparing the predetermined threshold with the score calculated by the additional searching unit.

7. The image retrieving apparatus according to claim 6, wherein a relation between the object of which the score is calculated as a discrimination target by the additional searching unit and the object of which the score is calculated by the basic searching unit satisfies one or both a condition that a size of the former object is smaller than a size of the latter object by a predetermined threshold or less and a condition that a position of the former object is more distant from the center of the image than a position of the latter object by a predetermined threshold or more.

8. The image retrieving apparatus according to claim 1, wherein the specific object is a whole body or a part of a person.

9. The image retrieving apparatus according to claim 8, wherein the specific object is a face of the person.

10. The image retrieving apparatus according to claim 1, further comprising a showing unit configured to show the image decided as the specific image by the basic searching unit and the image decided as the specific image by the additional searching unit, to a user, wherein
the showing unit shows the image decided as the specific image by the additional searching unit, according to a request of the user.

11. An image retrieving method comprising:
an image obtaining step of obtaining a plurality of images and storing the obtained plurality of images in a storage device;
a category obtaining step of obtaining respective categories to which the plurality of images obtained in the image obtaining step belongs;
a basic searching step of searching for a specific image, which is an image that includes a specific object, from among the images stored in the storage device;
a counting step of counting a number of the specific images that include the specific object for each category obtained in the category obtaining step;
a determining step of determining whether or not an additional search for the specific image that includes the specific object is to be performed for a category among the categories obtained in the category obtaining step, based on the number of the specific images that include the specific object of each category counted in the counting step; and
an additional searching step of searching for the specific image that includes the specific object from among the images, stored in the storage device, which belong to the category for which it has been determined in the determining step that the additional search is to be performed, the category for which it has been determined in the determining step that the additional search is to be performed including no specific images including the specific object based on a result of the search performed in the basic searching step.

12. A non-transitory computer-readable storage medium storing a program for causing a computer to perform:
an image obtaining step of obtaining a plurality of images and storing the obtained plurality of images in a storage device;
a category obtaining step of obtaining respective categories to which the plurality of images obtained in the image obtaining step belongs;
a basic searching step of searching for a specific image, which is an image that includes a specific object, from among the images stored in the storage device;
a counting step of counting a number of the specific images that include the specific object for each category obtained in the category obtaining step;
a determining step of determining whether or not an additional search for the specific image that includes the specific object is to be performed for a category among the categories obtained in the category obtaining step, based on the number of the specific images that include the specific object of each category counted in the counting step; and
an additional searching step of searching for the specific image that includes the specific object from among the images, stored in the storage device, which belong to the category for which it has been determined in the determining step that the additional search is to be performed, the category for which it has been determined in the determining step that the additional search is to be performed including no specific images including the specific object based on a result of the search performed in the basic searching step.

* * * * *